United States Patent
Wu et al.

(10) Patent No.: US 12,307,024 B2
(45) Date of Patent: May 20, 2025

(54) TRACKING SYSTEM AND TRACKING METHOD

(71) Applicant: HTC Corporation, Taoyuan (TW)

(72) Inventors: Chien-Min Wu, Taoyuan (TW); YuHui Hsu, Taoyuan (TW)

(73) Assignee: HTC Corporation, Taoyuan (TW)

(*) Notice: Subject to any disclaimer, the term of this patent is extended or adjusted under 35 U.S.C. 154(b) by 185 days.

(21) Appl. No.: 18/359,882

(22) Filed: Jul. 27, 2023

(65) Prior Publication Data

US 2024/0036656 A1 Feb. 1, 2024

Related U.S. Application Data

(60) Provisional application No. 63/392,496, filed on Jul. 27, 2022.

(51) Int. Cl.
*G06F 3/03* (2006.01)
*G06F 3/01* (2006.01)
*G06T 7/20* (2017.01)
*G06T 7/70* (2017.01)

(52) U.S. Cl.
CPC ............ *G06F 3/0304* (2013.01); *G06F 3/011* (2013.01); *G06T 7/20* (2013.01); *G06T 7/70* (2017.01); *G06T 2207/30196* (2013.01); *G06T 2207/30244* (2013.01)

(58) Field of Classification Search
CPC ........ G06F 3/011; G06F 3/017; G06F 3/0346; G06F 3/0304; G06T 7/246; G06T 7/70; G06T 7/20; G06T 2207/30244; G06T 2207/30196

See application file for complete search history.

(56) References Cited

U.S. PATENT DOCUMENTS

| | | | |
|---|---|---|---|
| 12,229,332 B1* | 2/2025 | Chung | G06F 3/011 |
| 2017/0357332 A1* | 12/2017 | Balan | G06F 3/017 |
| 2019/0318501 A1* | 10/2019 | Balan | A63F 13/212 |
| 2020/0089335 A1* | 3/2020 | Chou | G06F 3/011 |
| 2020/0326544 A1* | 10/2020 | Wan | G06T 7/277 |
| 2022/0308342 A1* | 9/2022 | Gullicksen | G01S 5/0226 |

* cited by examiner

*Primary Examiner* — Tsion B Owens
(74) *Attorney, Agent, or Firm* — JCIPRNET

(57) ABSTRACT

A tracking system is provided. The tracking system includes a three degree-of-freedom (3DoF) device, a camera, and a processor. The 3DoF device is adapted to be mounted on a control device worn or hold on a body portion of a user. The 3DoF device is configured to obtain sensor data from a 3DoF sensor of the 3DoF device. The camera is configured to obtain camera data. The camera data comprises an image of the body portion of the user or the control device as a tracking target. The processor is configured to: track the tracking target to generate a tracking result based on the sensor data and the camera data; determine the tracking target being static or not based on the tracking result; determine a target pose of the tracking target based on the tracking result; and calibrate an accumulative error of the 3DoF sensor in background.

20 Claims, 6 Drawing Sheets

TRACKING SYSTEM AND TRACKING METHOD

CROSS-REFERENCE TO RELATED APPLICATION

This application claims the priority benefit of U.S. provisional application Ser. No. 63/392,496, filed on Jul. 27, 2022. The entirety of the above-mentioned patent application is hereby incorporated by reference herein and made a part of this specification.

BACKGROUND

Technical Field

The disclosure relates to a tracking system; particularly, the disclosure relates to a tracking system and a tracking method.

Description of Related Art

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

SUMMARY

The disclosure is direct to a tracking system and a tracking method, so as to calibrate an accumulative error of a three degree-of-freedom (3DoF) device.

In this disclosure, a tracking system is provided. The tracking system includes a three degree-of-freedom (3DoF) device, a camera, and a processor. The 3DoF device is adapted to be mounted on a control device worn or hold on a body portion of a user. The 3DoF device is configured to obtain sensor data from a 3DoF sensor of the 3DoF device. The camera is configured to obtain camera data. The camera data comprises an image of the body portion of the user or the control device as a tracking target. The processor is configured to: track the tracking target to generate a tracking result based on the sensor data and the camera data; determine the tracking target being static or not based on the tracking result; determine a target pose of a tracking target based on the tracking result; and in response to the tracking target being static and the target pose being a calibration pose, calibrate an accumulative error of the 3DoF sensor in background.

In this disclosure, a tracking method is provided. The tracking method is adapted to a three degree-of-freedom (3DoF) device adapted to be mounted on a control device worn or hold on a body portion of a user. The tracking method includes: obtaining sensor data from a 3DoF sensor of the 3DoF device; obtain camera data, wherein the camera data comprises an image of the body portion of the user or the control device as a tracking target; tracking the tracking target to generate a tracking result based on the sensor data and the camera data; determining the tracking target being static or not based on the tracking result; determining a target pose of the tracking target based on the tracking result; and in response to the tracking target being static and the target pose being a calibration pose, calibrating an accumulative error of the 3DoF sensor in background.

Based on the above, according to the tracking system and the tracking method, the calibration of a 3DoF sensor of the 3DoF device may be performed in the background without the user noticing (e.g., without interrupting the gaming experience), thereby increasing the user experience.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
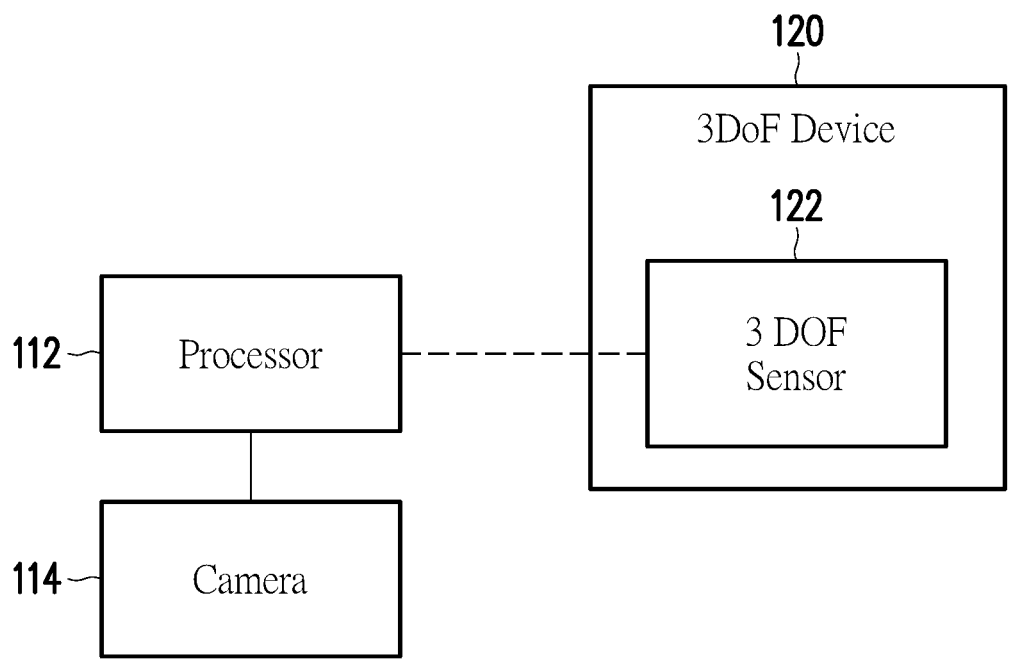
FIG. 1 is a schematic diagram of a tracking system according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

In order to bring an immersive experience to user, technologies related to XR, AR, VR, and MR are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

In order to present a smooth experience in the virtual world, multiple devices are often used to detect a movement of a user or an object. For example, an inertial measurement unit (IMU) which comprises accelerometers, gyroscopes, other similar device, or a combination of these devices are commonly used to detect the movement of the user or the object. For example, gyroscopes are commonly used to detect the amount of rotation of an object. A rate of rotation is measured in degrees per second, and by integrating the rate of the rotation over time, an angle of the rotation may be obtained. However, the orientation and/or position measurements from the IMU may have a tendency to slowly change over time, even when no external forces are acting on the IMU. This phenomenon is called a drift, which may cause measurement errors. In other words, a gyroscope itself may generate an error during the operation due to time accumulation, thereby causing detection result of the IMU may be gradually distorted. Thus, a distortion of a virtual object in the virtual world corresponding to the IMU may happen.

There are many ways to resolve the accumulative error. Take the gyroscope for an example. Specifically, the measurement values of the gyroscope may include a pitch angle, a roll angle, and a yaw angle. Due to the physical characteristics, the pitch angle and the roll angle may be corrected using the gravity axis. For the yaw angle, an external device may be used as a reference to correct the accumulative error. For example, the user may be requested to align the gyroscope with the reference in the real world. Alternatively, the user may be requested to perform a sequence of poses to correct the accumulative error. That is, most of the solutions are not so intuitive and an external device may be needed. Therefore, it is the pursuit of people skilled in the art to provide an intuitive and convenient way to calibrate the accumulative error of a gyroscope.

FIG. 1 is a schematic diagram of a tracking system according to an embodiment of the disclosure. With reference to FIG. 1, a tracking system 100 may include a three degree-of-freedom (3DoF) device 120, a camera 114, and a processor 112. The 3DoF device 120 may be adapted to be mounted on a control device (not shown) and the control device may be adapted to be worn or hold on a body portion of a user. Moreover, the 3DoF device 120 may be configured to obtain a sensor data from a 3DoF sensor 122 of the 3DoF device 120. The camera 114 may be configured to obtain camera data. The camera data may include an image of the body portion of the user or the control device (not shown) as a tracking target. The processor 112 may be configured to track the tracking target to generate a tracking result based on the sensor data and the camera data. Further, the processor 112 may be configured to determine the tracking target being static or not based on the tracking result. Furthermore, the processor 112 may be configured to determine a target pose of the tracking target based on the tracking result. In addition, the processor 112 may be configured to, in response to the tracking target being static and the target pose of the tracking target being a calibration pose, calibrate an accumulative error of the 3DoF sensor 122 in background. In this manner, the accumulative error of the 3DoF sensor 122 of the 3DoF device 120 may be corrected in the background without the user noticing, thereby increasing the user experience.

In one embodiment, the processor 112 and the camera 114 may be included in a head-mounted display (HMD) device. In one embodiment, the HMD device may be configured to display content of AR, VR, MR, or XR. The head-mounted display device may include, for example, a headset, wearable glasses (e.g., AR/VR goggles), other similar devices adapted for AR, VR, MR, XR or other reality related technologies, or a combination of these devices. However, this disclosure is not limited thereto. It is noted that, while it is depicted for the sake of convenience in explanation that the processor 112 and the camera 114 may be included in the HMD device, the processor 112 and the camera 114 may be disposed separately. That is, this disclosure does not limit the where the processor 112 and the camera 114 being disposed.

In one embodiment, the processor 112 includes, for example, a microcontroller unit (MCU), a central processing unit (CPU), a microprocessor, a digital signal processor (DSP), a programmable controller, a programmable logic device (PLD), other similar devices, or a combination of these devices. The disclosure is not limited thereto. In addition, in an embodiment, each of functions of the processor 112 may be achieved as multiple program codes. The program codes are stored in a memory, and executed by the processor 112. Alternatively, in an embodiment, each of the functions of the processor 112 may be achieved as one or more circuits. The disclosure does not limit the use of software or hardware to achieve the functions of the processor 112.

In one embodiment, the camera 114, may include, for example, a complementary metal oxide semiconductor (CMOS) camera, a charge coupled device (CCD) camera, a light detection and ranging (LiDAR) device, a radar, an infrared sensor, an ultrasonic sensor, other similar devices, or a combination of these devices. The disclosure is not limited thereto.

In one embodiment, the control device (not shown) may include, for example, a toy gun, a joystick, a bat, a racket, other similar devices, or a combination of these devices. In another embodiment, the control device may include, for example, a wrist band, a glove, a gauntlet, other similar devices, or a combination of these devices. Further, at the same time, the user may hold the toy gun, the joystick, the bat, the racket, other similar devices, or a combination of these devices. Since the 3DoF device 120 is adapted to be mounted on the control device, the 3DoF sensor 122 of the 3DoF device 120 may be able to detect a movement of the control device. That is, the 3DoF sensor 122 of the 3DoF device 120 may be configured to directly or indirectly detect the movement of the toy gun, the joystick, the bat, the racket, other similar devices, or a combination of these devices by detecting the movement of the 3DoF device 120. It is noted that, for the sake of convenience in explanation, it is described that the control device may be a handheld device or a hand-worn device. However, this disclosure is not limited thereto. In yet another embodiment, the control device may be adapted to be worn on a foot or a leg of a user.

In one embodiment, the 3DoF sensor 122 may include, for example, an IMU, an accelerometer, a gyroscope, other similar devices, or a combination of these devices. This disclosure is not limited thereto. In one embodiment, the 3DoF sensor 122 may be configured to detect sensor data and the sensor data may include three angular velocities in three degrees of freedom (DoF). The three angular velocities may include a roll angular velocity about an X axis, a pitch angular velocity about a Y axis, and a yaw angular velocity about a Z axis. By integrating the angular velocities over time, three angles of the rotation may be obtained. The three angles of the rotation may be the pitch angle, the roll angle, and the yaw angle.

In one embodiment, the tracking system 100 may further include a display. The display may be configured to display a virtual device corresponding to the control device mounted with the 3DoF device 120 in a virtual world. In one embodiment, the display may be included in the HMD device, but this disclosure is not limited thereto. In one embodiment, the display may include, for example, an organic light-emitting diode (OLED) display device, a mini LED display device, a micro LED display device, a quantum dot (QD) LED display device, a liquid-crystal display (LCD) display device, a tiled display device, a foldable display device, or an electronic paper display (EPD). However, this disclosure is not limited thereto. In addition, each of the 3DoF device 120, the processor 112, and the camera 114 may include or may be coupled a network module, so that the 3DoF device 120, the processor 112, and the camera 114 may be able to communicate with each other. In one embodiment, the network module may include, for example, a wired network module, a wireless network module, a Bluetooth module, an infrared module, a radio frequency identification (RFID) module, a Zigbee network module, or a near field communication (NFC) network module. However, this disclosure is not limited thereto.

In one embodiment, the tracking system 100 may further include an additional device. The additional device may be adapted to be worn on a body portion (e.g., hand, wrist, foot, leg . . . etc.) of the user. In one embodiment, the additional device may be tracked by the camera 114. That is, the camera data may include images of the additional device. In other words, the additional device may be also used as the tracking target to assist in generating the tracking result. Further, the additional device may include a 6 degree-of-freedom (6DoF) sensor, so that the additional device is able to track the additional device itself. Furthermore, in addition to the sensor data and the camera data, the additional device may be configured to obtain additional data for tracking the tracking target (i.e., the hand or the control device). That is, after the additional device being worn on the body portion, the processor 112 may be configured to track the tracking target to generate the tracking result based on the sensor data, the camera data, and the additional data. Therefore, the accuracy of the tracking result may be improved.

Figure 2A:
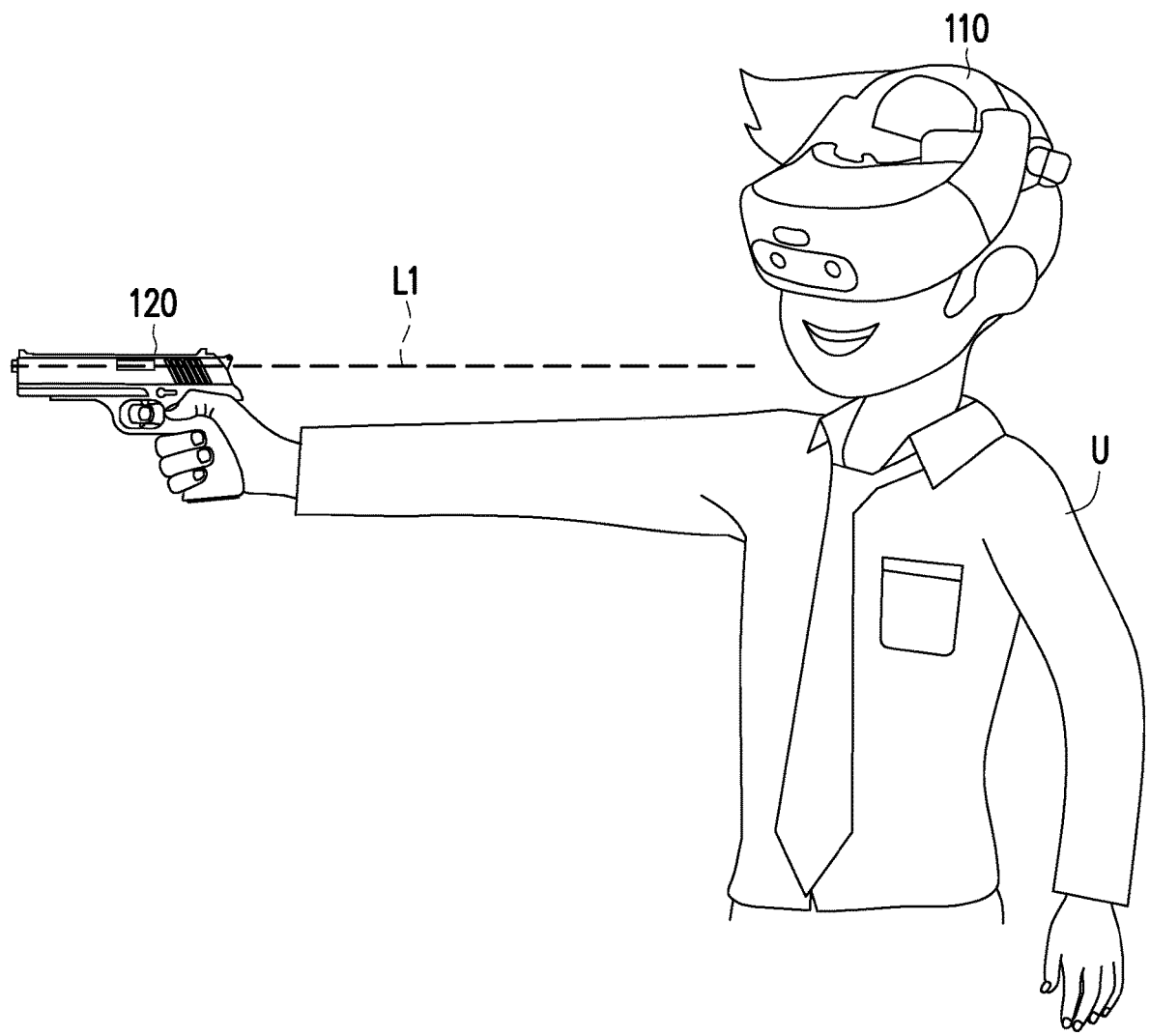
FIG. 2A is a schematic diagram of a tracking scenario of a tracking system in a real world according to an embodiment of the disclosure.

FIG. 2A is a schematic diagram of a tracking scenario of a tracking system in a real world according to an embodiment of the disclosure. With reference to FIG. 1 and FIG. 2A, in a tracking scenario 200A, a user U may wear the HMD device 110 on his head and holds the control device (e.g., the toy gun) mounted with the 3DoF device 120 in this hand in a real world. For the sake of convenience in explanation, it is depicted that the 3DoF device 120 is hidden in the control device, but this disclosure is not limited thereto. Through an HMD device 110, an immersive experience in a virtual world may be provided to the user U. In one embodiment, the user U may intend to aim a virtual enemy in the virtual world. Under this circumstance, the user U may straighten the arm and strike an aiming pose with the control device (e.g., the toy gun) mounted with the 3DoF device 120. That is, as shown in FIG. 2A, the control device mounted with the 3DoF device 120 and the arm of the user U may be aligned on a first alignment line L1. Moreover, the processor 112 may be configured to track the hand of the user U or track the control device (e.g., the toy gun) mounted with the 3DoF device 120 to generate a tracking result. In other words, the hand of the user U or the control device mounted with the 3DoF device 120 may be regarded as the tracking target. In one embodiment, the processor 112 may be configured to track the tracking target based on the sensor data of the 3DoF sensor 122 and/or the camera data of the camera 114. Therefore, based on the tracking result, the processor 112 may be configured to update a virtual device corresponding to the control device mounted with the 3DoF device 120 in the virtual world.

Figure 2B:
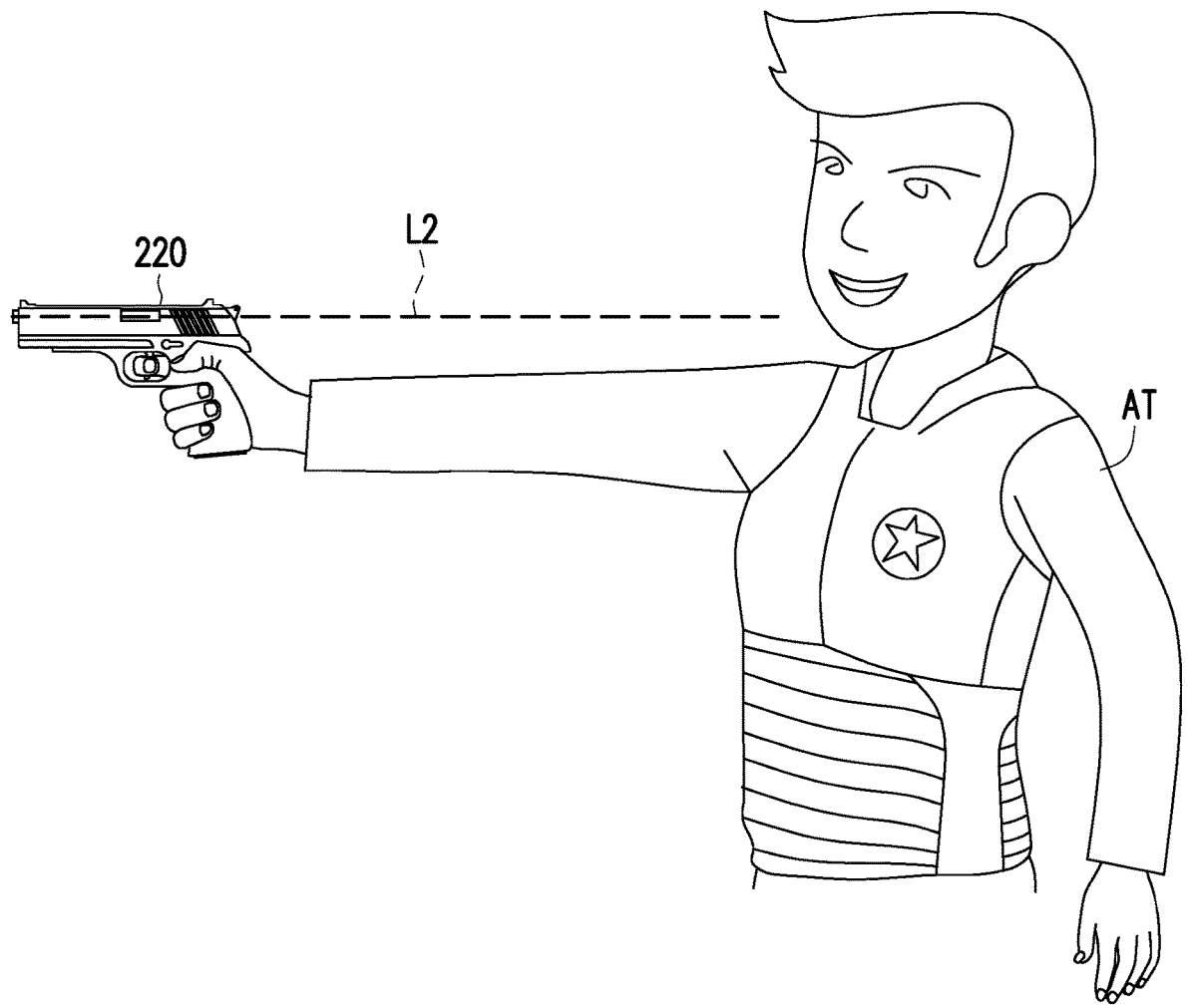
FIG. 2B is a schematic diagram of a tracking scenario of a tracking system in a virtual world according to an embodiment of the disclosure.

FIG. 2B is a schematic diagram of a tracking scenario of a tracking system in a virtual world according to an embodiment of the disclosure. With reference to FIG. 1 to FIG. 2B, in a tracking scenario 200B, an avatar AT may hold a virtual device 220 in the virtual world displayed by the HMD device 110. The avatar AT may correspond to the user U and the virtual device 220 may correspond to the control device (e.g., the toy gun) mounted with the 3DoF device 120. While the user U intends to aim a virtual enemy in the virtual world, in response to the pose of the user U in the real world, the avatar AT may straighten the arm and strike an aiming pose with the virtual device 220. That is, as shown in FIG. 2B, the virtual device 220 and the arm of the avatar AT may be aligned on a second alignment line L2.

In one embodiment, the processor 112 may be configured to perform a hand tracking to generate a first tracking result based on the camera data utilizing a hand tracking algorithm. For example, the camera 114 may be configured to capture hand images of the hand of the user U. Based on the hand images, the processor 112 may be configured to generate the first tracking result. That is, a hand pose (i.e., target pose) of the hand of the user U (i.e., tracking target) may be determined based on the first tracking result.

In another embodiment, the processor 112 may be configured to perform an object detection to generate the first tracking result based on the camera data utilizing an object detection algorithm. That is, the shape of the control device mounted with the 3DoF device 120 and/or the additional device (i.e., a pre-stored image) may be pre-stored in a memory of the HMD device 110. Further, the camera 114 may be configured to capture an object image including the control device and/or the additional device mounted with the 3DoF device 120. The object image may be included in the camera data. Based on the object image and the pre-stored image, the processor 112 may be configured to generate the first tracking result. In this manner, the processor 112 may be configured to determine an object pose (i.e., the target pose) of the control device (i.e., the tracking target) based on the sensor data and the camera data (i.e., the object image).

In one embodiment, the hand of the user U, the control device (e.g., the toy gun), or the additional device may be equipped with at least one optical marker. Further, the camera 114 may be configured to capture a marker image including the optical marker. The marker image may be included in the camera data. Based on the marker image, the processor 112 may be configured to generate an optical tracking result. That is, the first tracking result may not only include the result based on the hand tracking algorithm and/or the object detection algorithm, but also the optical tracking result. Therefore, the accuracy of the tracking result may be improved.

In addition, the 3DoF sensor 122 of the 3DoF device 120 may be configured to detect the movement of the control device mounted with the 3DoF device 120. Based on the detected movement (i.e., sensor data of the 3DoF sensor 122), the processor 112 may be configured to generate a second tracking result. That is, a target pose of the tracking target (i.e., control device mounted with the 3DoF device 120 or the hand of the user U) may be determined based on the second tracking result. Moreover, since the control device mounted with the 3DoF device 120 is hold or worn by the hand of the user U, the hand pose of the hand of the user U may be similar or same as the object pose of the control device mounted with the 3DoF device 120.

Figure 3:
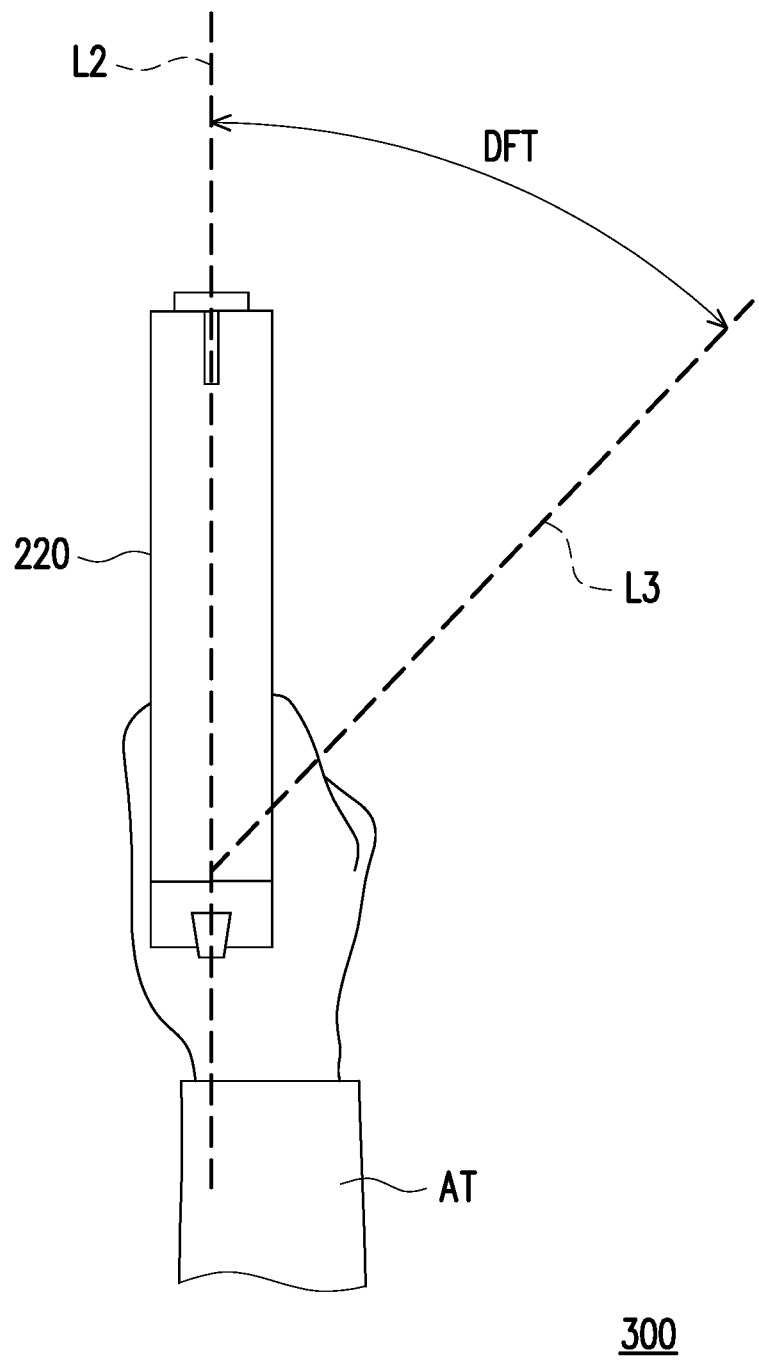
FIG. 3 is a schematic diagram of a tracking scenario of a tracking system in a virtual world according to an embodiment of the disclosure.

FIG. 3 is a schematic diagram of a tracking scenario of a tracking system in a virtual world according to an embodiment of the disclosure. With reference to FIG. 1 to FIG. 3, in a tracking scenario 300, FIG. 3 is an embodiment of a top view of part of the tracking 200B in FIG. 2B. It is noted that, due to an accumulative error of the 3DoF sensor 122 of the 3DoF device 120, the pose of the virtual device 220 may change even if the pose of the control device mounted with the 3DoF device 120 does not change. In other words, after the deviation, as shown in FIG. 3, the arm of the avatar AT may be still aligned on the second alignment line L2, but the virtual device 220 may be aligned on a third alignment line L3 instead of the second alignment line L2.

Specifically, a current yaw angle of the 3DoF sensor 122 may be drifted from a correct yaw angle of the 3DoF sensor 122 due to the accumulation error of the 3DoF sensor 122. In this situation, the processor 112 may be configured to obtain the correct yaw angle based on the tracking result from the HMD device 110 and determine the correct yaw angle as the current yaw angle. To be more specific, the processor 112 may be configured to determine the correct yaw angle (i.e., the correct line) based on the camera data (e.g., the first tracking result) through the camera 114 and determine the current yaw angle (i.e., the current line) based on the sensor data (e.g., the second tracking result) through the 3DoF sensor 122. In one embodiment, the processor 112 may be configured to determine the correct line along a direction of an arm of the user U and determine the current line based on sensor data of the 3DoF sensor 122. Further, the processor 112 may be configured to calibrate the current yaw angle based on the correct line (i.e., second alignment line L2) and the current line (i.e., third alignment line L3). Therefore, the accumulation error of the 3DoF sensor 122 may be calibrated.

In one embodiment, the second alignment line L2 may be known as a correct line and the third alignment line L3 may be known as a current line. Further, the correct line may represent a correct yaw angle of the 3DoF sensor 122 and the current line may represent a current yaw angle of the 3DoF sensor 122. A drift angle DFT (of the yaw angle) may be defined as an angle between the correct yaw angle (i.e., the correct line) and the current yaw angle (i.e., the current line).

In one embodiment, while the drift angle DFT is real small, the user U may not even notice the drift of the yaw angle (i.e., the drift of the virtual device 220). However, while the drift angle DFT is greater than a certain value, the user U may start to notice there is something wrong with the yaw angle (i.e. the pose of the virtual device 220).

In order to prevent this kind of situation from happening, while the drift angle DFT is still small (i.e., smaller than the certain value), the drift angle DFT may be calibrated to reduce the influence of the accumulative error. That is, in response to the drift angle DFT being smaller than a threshold angle, the processor 112 may be configured to determine the correct line as the current line. Furthermore, the pose of the virtual device 220 may be corrected based on a current yaw angle of the 3DoF sensor 122. In other words, the processor 112 may be configured to determine a virtual device pose of the virtual device 220 corresponding to a physical pose of the control device mounted with the 3DoF device 120 after the accumulative of the 3DoF sensor 122 being calibrated. Further, the processor 112 may be configured to display the virtual device with the virtual device pose by a display.

Moreover, while the drift angle DFT is greater than the certain value, the drift angle DFT may be calibrated based on a different mechanism. That is, if the drift angle DFT greater than the certain value is calibrated all at once, the user U may clearly feel the correction of the pose of the virtual device 220. Therefore, while the drift angle DFT is greater than the certain value, the drift angle DFT may be cut into pieces for the calibration. For example, half of the drift angle DFT may be calibrated at a first time point. Then, the remaining half of the drift angle DFT may be calibrated at a second time point after the first time point. In other words, a calibration line may be determined between the correction line and the current line for the two-stage calibration. That is, the processor 112 may be configured to determine a calibration line between the correct line and the current line, in response to the drift angle DFT being not smaller than the threshold angle. This process may be also known as a smooth process. In this manner, the calibration may be performed in the background without the user U noticing.

Figure 4:
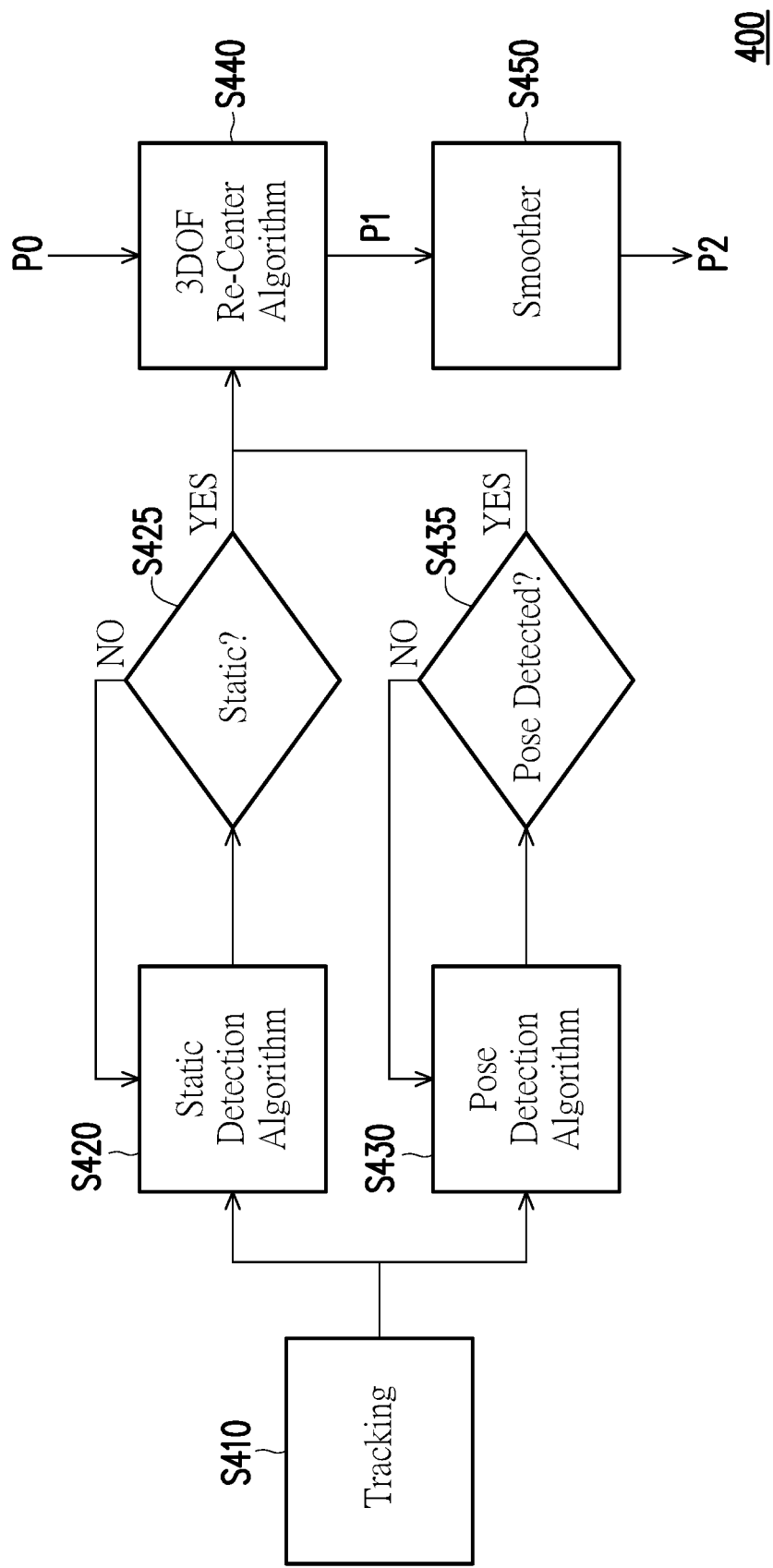
FIG. 4 is a schematic flowchart of a tracking system according to an embodiment of the disclosure.

FIG. 4 is a schematic flowchart of a tracking system according to an embodiment of the disclosure. With reference to FIG. 1 to FIG. 4, a tracking method 400 may include a step S410, a step S420, a step S425, a step S430, a step S435, a step S440, and a step S450.

In order to increase the efficiency of calibrating the accumulative error of the 3DoF sensor 122, it is better to obtain the correct pose of the control device (i.e., the correct line) only while the hand of user U is not moving. That is, the calibration of the 3DoF sensor 122 may be performed while the tracking target (e.g., the hand of the user U or the control device mounted with the 3DoF device 120) is static. In addition, in order to calibrate the accumulative error of the 3DoF sensor 122 without the user U noticing, it is better to choose a pose of the user U perform often in the virtual world for the calibration. For example, in a shooting game, the user U may often strike an aiming pose. That is, the aiming pose may be utilized as a trigger mechanism for the calibration (i.e., a calibration pose). In one embodiment, the calibration pose may include, for example, a pose of the user U being aiming with the control device mounted with the 3DoF device 120, a pose of the user U being pointing with the control device mounted with the 3DoF device 120, a pose of an arm of the user U being straight, or other similar poses.

In one embodiment, in order to increase the efficiency of calibration and perform the calibration without the user U noticing, the tracking method 400 may introduce a static detection algorithm and a pose detection algorithm. That is, the static detection algorithm is configured to determine that whether the tracking target (e.g., the hand of the user U or the control device mounted with the 3DoF device 120) is static or not and the pose detection algorithm configured to determine that the target pose (e.g., the hand pose of the hand of the user U or the object pose of the control device mounted with the 3DoF device 120) is the calibration pose or not.

To be more specific, in the step S410 a tracking may be performed by the tracking system 100. The tracking may include at least one of the hand tracking, the optical tracking, and the object detection, or a combination with another tracking system (e.g., the aforementioned additional device, but this disclosure is not limited thereto. In the step S420, the processor 112 may be configured to perform the static detection algorithm. In the step S425, the processor 112 may be configured to determine the tracking target (e.g., the hand or the control device) being static or not. In one embodiment, the processor 112 may be configured to determine the tracking target being static or not based on the first tracking result through the camera 114. In another embodiment, the processor 112 may be configured to determine the tracking target being static or not based on the second tracking result through the 3DoF device 120. In response to the tracking target being not static, the processor 112 may be configured to perform the step S420 again. On the other hand, in response to the tracking target being static, the processor 112 may be configured to perform the step S440.

In the step S430, the processor 112 may be configured to perform the pose detection algorithm. Similar as the tracking, the pose detection algorithm may be performed based on at least one of the hand tracking, the optical tracking, and the object detection through the camera 114, or an additional tracking result (i.e., additional data) by the additional device. That is, the processor 112 may be configured to perform the pose detection algorithm based on the first tracking result through the camera 114 and/or the additional tracking result through the additional device. In the step S435, the processor 112 may be configured to determine the target pose the tracking target being the calibration pose or not based on the first tracking result through the camera 114. In response to the target pose being not the calibration pose, the processor 112 may be configured to perform the step S430 again. On the other hand, in response to the target pose being the calibration pose, the processor 112 may be configured to perform the step S440. It is noted that, in one embodiment, as long as the condition of the step S425 or the step S435 is met, the step S440 may be performed. In another embodiment, only when both conditions of the step S425 and the step S435 are met, the step S440 may be performed. However, this disclosure is not limited thereto.

In the step S440, a 3DoF re-center algorithm may be performed. A current pose P0 (i.e., the current yaw angle) of the 3DoF device 120 may be input and a correct pose P1 (i.e., the correct yaw angle) of the 3DoF device 120 may be output. In one embodiment, the current pose P0 may be determined based on the second tracking result through the 3DoF sensor 122 and the correct pose P1 may be determined based on the first tracking result through the camera 114. In the step S450, based on a difference between the current pose P0 and the correct pose P1, the processor 112 may be configured to use the a smoother (e.g., perform a smooth process) to smooth the different. Then, a calibrated pose P2 may be output from the smoother to calibrate the accumulative error of the 3DoF sensor 122 without user U noticing.

Figure 5:
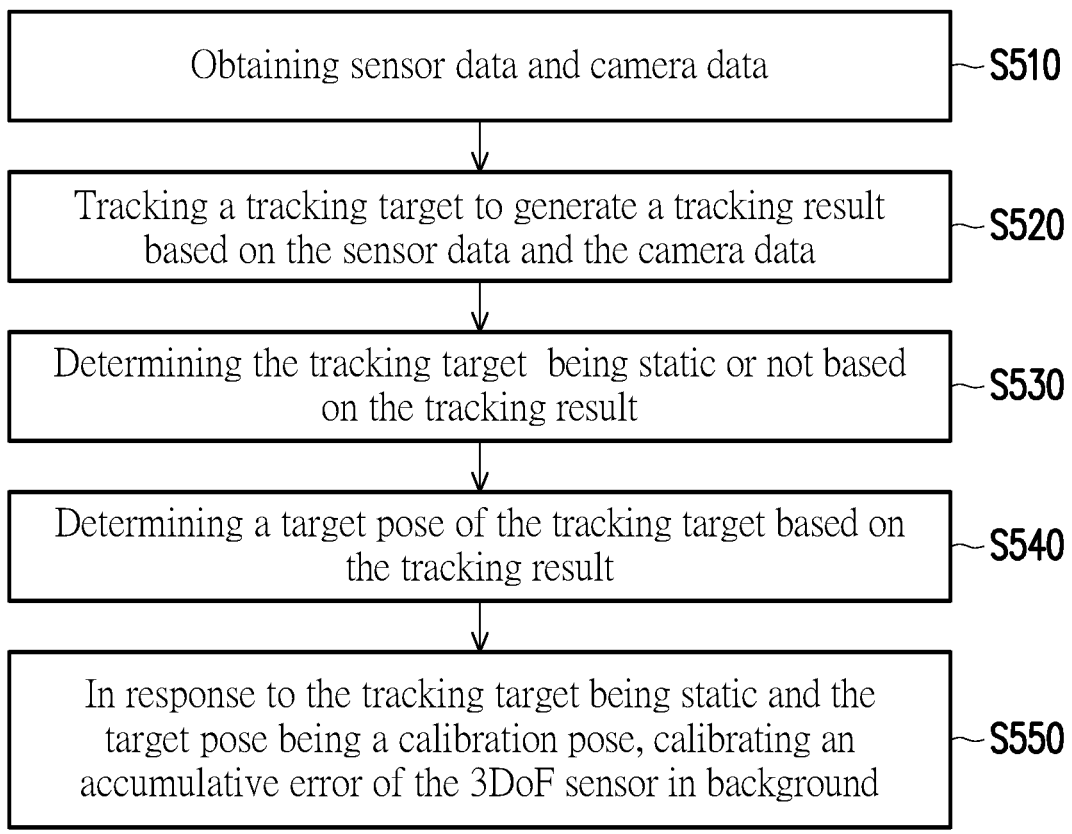
FIG. 5 is a schematic flowchart of a tracking method according to an embodiment of the disclosure.

FIG. 5 is a schematic flowchart of a tracking method according to an embodiment of the disclosure. With reference to FIG. 1 to FIG. 5, a tracking method 500 may include a step S510, a step S520, a step S530, a step S540, and a step S550.

In the step S510, the sensor data may be obtained from the 3DoF sensor 122 of the 3DoF device 120 and camera data may be obtained from the camera 114. The camera data may include an image of the body portion of the user or the control device mounted with the 3DoF device 120 as a tracking target. In the step S520, the tracking target may be tracked to generate a tracking result based on the sensor data and the camera data. In the step S530, the tracking target being static or not may be determined based on the tracking result. In the step S540, a target pose of the tracking target may be determined based on the tracking result. In the step S550, in response to the tracking target being static and the target pose being the calibration pose, an accumulative error of the 3DoF device 120 may be calibrated in background.

In addition, the implementation details of the tracking method 500 may be referred to the descriptions of FIG. 1 to FIG. 4 to obtain sufficient teachings, suggestions, and implementation embodiments, while the details are not redundantly described seriatim herein.

In summary, according to the tracking system 100 and the tracking method 500, by detecting the calibration pose, the 3DoF sensor 122 may be calibrated by aligning the axis of the control device mounted with the 3DoF device 120 with the axis of the arm of the user U. In this manner, the calibration of the 3DoF sensor 122 may be performed in the background without the user U noticing (e.g., without interrupting the gaming experience). Therefore, the accumulative error of the 3DoF device 120 may be corrected, thereby increasing the user experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A tracking system, comprising:
a three degree-of-freedom (3DoF) device, adapted to be mounted on a control device worn or hold on a body portion of a user, wherein the 3DoF device is configured to obtain sensor data from a 3DoF sensor of the 3DoF device;
a camera, configured to obtain camera data, wherein the camera data comprises an image of the body portion of the user or the control device as a tracking target; and
a processor, configured to:
track the tracking target to generate a tracking result based on the sensor data and the camera data;
determine the tracking target being static or not based on the tracking result;
determine a target pose of the tracking target based on the tracking result; and
in response to the tracking target being static and the target pose being a calibration pose, calibrate an accumulative error of the 3DoF sensor in background.
2. The tracking system according to claim 1, wherein the processor is further configured to:

obtain a correct yaw angle based on the tracking result; and determine the correct yaw angle as a current yaw angle.

3. The tracking system according to claim 1, wherein the camera is mounted on a head-mounted device worn on a head of the user, and the processor is further configured to:

determine the target pose of the tracking target based on the camera data.

4. The tracking system according to claim 1, wherein the processor is further configured to:

determine the tracking target being static or not based on the camera data.

5. The tracking system according to claim 1, wherein the processor is further configured to:

determine the tracking target being static or not based on the sensor data.

6. The tracking system according to claim 1, wherein the processor is further configured to:

determine a correct line based on the camera data;
determine a current line based on the sensor data; and
calibrate a current yaw angle based on the correct line and the current line.

7. The tracking system according to claim 6, wherein the processor is further configured to:

determine the correct line along a direction of an arm of the user, wherein the control device is worn or hold on a hand of the arm; and determine the current line based on the sensor data, wherein the sensor data comprises the current yaw angle.

8. The tracking system according to claim 6, wherein the processor is further configured to:

determine a drift angle based on an angle between the correct line and the current line;

in response to the drift angle being smaller than a threshold angle, determine the correct line as the current line.

9. The tracking system according to claim 8, wherein the processor is further configured to:

in response to the drift angle being not smaller than the threshold angle, determine a calibration line between the correct line and the current line; and determine the calibration line as the current line.

10. The tracking system according to claim 1, wherein the calibration pose comprises at least one of a pose of the user being aiming with the control device, a pose of the user being pointing with the control device, and a pose of an arm of the user being straight.

11. The tracking system according to claim 1, wherein the processor is further configured to:

determine a virtual device pose of a virtual device corresponding to a physical pose of the control device after the accumulative error of the 3DoF sensor being calibrated; and displaying the virtual device with the virtual device pose by a display.

12. A tracking method, adapted to a three degree-of-freedom (3DoF) device adapted to be mounted on a control device worn or hold on a body portion of a user, comprising:

obtaining sensor data from a 3DoF sensor of the 3DoF device;

obtain camera data, wherein the camera data comprises an image of the body portion of the user or the control device as a tracking target;

tracking the tracking target to generate a tracking result based on the sensor data and the camera data;

determining the tracking target being static or not based on the tracking result;

determining a target pose of the tracking target based on the tracking result; and in response to the tracking target being static and the target pose being a calibration pose, calibrating an accumulative error of the 3DoF sensor in background.

13. The tracking method according to claim 12, further comprising:

obtaining a correct yaw angle based on the tracking result; and determining the correct yaw angle as a current yaw angle.

14. The tracking method according to claim 12, wherein the camera data is obtained by a camera and the camera is mounted on a head-mounted device worn on a head of the user, and the tracking method comprises:

determining the target pose of the tracking target based on the camera data.

15. The tracking method according to claim 12, further comprising:

determining the tracking target being static or not based on the camera data.

16. The tracking method according to claim 12, further comprising:

determining the tracking target being static or not based on the sensor data.

17. The tracking method according to claim 12, further comprising:

determining a correct line based on the camera data;
determining a current line based on the sensor data; and
calibrating a current yaw angle based on the correct line and the current line.

18. The tracking method according to claim 17, further comprising:

determining the correct line along a direction of an arm of the user, wherein the control device is worn or hold on a hand of the arm; and determining the current line based on the sensor data, wherein the sensor data comprises the current yaw angle.

19. The tracking method according to claim 17, further comprising:

determining a drift angle based on an angle between the correct line and the current line;

in response to the drift angle being smaller than a threshold angle, determining the correct line as the current line.

20. The tracking method according to claim 19, further comprising:

in response to the drift angle being not smaller than the threshold angle, determining a calibration line between the correct line and the current line; and determining the calibration line as the current line.

* * * * *